Feb. 1, 1966 A. ANDERSON 3,233,231

MACHINE TOOL

Filed April 23, 1963

INVENTOR.
Axel Anderson
BY
Hofgren, Wegner, Allen,
Stellman & McCord
Attys

United States Patent Office 3,233,231
Patented Feb. 1, 1966

3,233,231
MACHINE TOOL
Axel Anderson, Rockford, Ill., assignor to Sundstrand Corporation, a corporation of Illinois
Filed Apr. 23, 1963, Ser. No. 275,037
2 Claims. (Cl. 340—199)

This invention relates to machine tools and more particularly to mechanism for indicating and detecting the zero position of a machine tool component which is under the control of numerical data.

At the present time, it is known to control machine tool components by means of numerical control data carried on a tape or other medium and frequently, as at the end of a cycle, it is necessary to command the particular component to return relative to its axis to a zero position within a fine degree of accuracy, such as .0002". It can arise that the component does not return to the zero position, due to incorrect programming of the cycle or a loss of an incremental command in a control system directing the component to move from position to position. Additionally, there can be a loss of synchronization in the numerical control system or a drift in the power supply to the machine tool as well as a null shift in a servo valve used in controlling the movement of the component.

In view of the foregoing possibilities of the machine tool component not returning to a zero position, it is desirable to check to see if the component did arrive at the zero position by detecting and indicating mechanism not influenced by the numerical control system.

Accordingly, an object of this invention is to provide a machine tool having zero position detecting and indicating mechanism for a machine tool component which is independent of the control system for the component.

Another object of the invention is to provide a zero position detecting and indicating mechanism for use in a machine tool in which the mechanism is engageably by a part of the movable component and embodies electrical mechanism which is extremely sensitive and provides an indication on a meter of the position of the component.

Still another object of the invention is to provide a numerically controlled machine tool having a pair of components with one movable relative to the other along an axis and in response to numerical control data with means for indicating the location of said one component at a zero position on said axis.

A further object of the invention is to provide a zero position detecting and indicating mechanism in which a pair of coils are connected in circuit in opposing relation, with an electromagnetic field exerted thereon with means for varying the field with respect to the coils and a meter in circuit with the coils to detect a current flow in the circuit and provide an indication of positioning of a part engageable with the zero position detecting mechanism.

Further objects and advantages will become apparent from the following detailed description taken in connection with the accompanying drawings in which.

Figure 1:
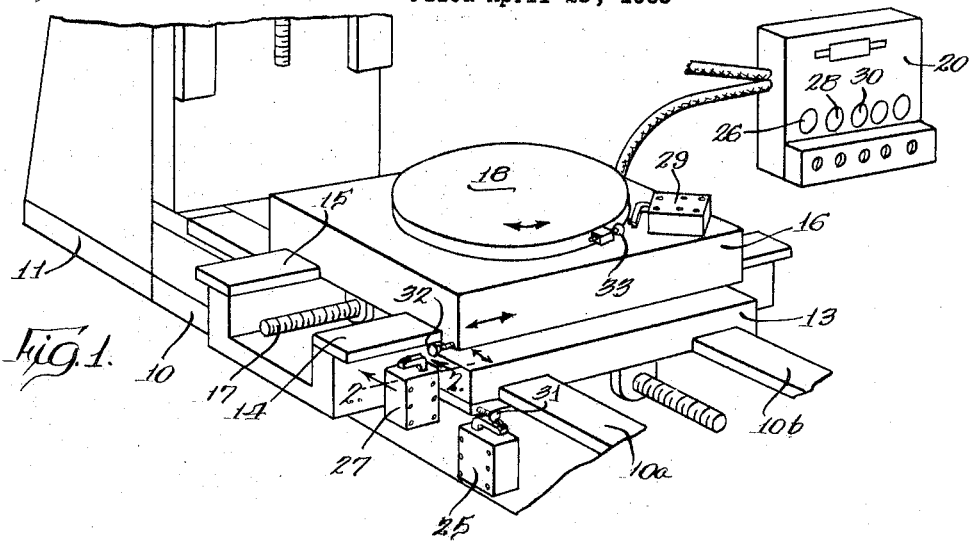
FIG. 1 is a fragmentary, perspective view of a machine tool embodying the invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

In the machine tool shown in part in FIG. 1, a bed 10 has a column 11 upstanding from an end thereof. The bed has ways 10a and 10b which support a cross-slide 13 for movement along an axis. The cross-slide 13 has ways 14 and 15 which support a table 16 for movement along a second axis, as obtained by rotation of a lead screw 17 driven by a suitable drive. The table 16 supports a rotary table 18 which is rotatable about a third axis of movement, with the rotary table carrying a workpiece for positioning along the three axes provided by the cross-slide, table and rotary table. Reference may be made to the copending United States Letters Patent application of Fred R. Swanson and Carl F. Erikson, Serial No. 162,148, filed December 26, 1961, for a more detailed description of the machine tool.

The movements of the cross-slide 13, table 16, and rotary table 18 are obtained from a numerical control system, indicated generally at 20, and as known in the art includes a "tape reader" or the like for reading signals of a previously programmed cycle from a tape or card and feeding the information to the drives for the various axes of movement. A series of commands are derived from the tape and can be either position-to-position commands or point-to-point commands. In moving from position-to-position, you can lose track of a predetermined zero position along an axis which is established when a machine tool is initially set up and from which the initial command is referenced. Additionally, the zero position can be lost, due to incorrect programming, and at the end of a cycle, the tape would not direct the machine tool components back to their zero positions. Further, drifts in the power supply or a null shift in a servo valve to the drive motors resulting from dirt or the like could also result in improper return to zero position.

In order to have an established zero position which is not influenced by the numerical control system, each of the axes of movement for the cross-slide 13, table 16 and rotary table 18 are provided with a zero position detecting and indicating system. This can also be provided for the other axes (not shown). For the cross-slide 13, this embodies a zero position detector 25 and a meter 26. For the table 16, a position detector is indicated at 27 and a meter at 28. For the rotary table 18, the detector is indicated at 29 and the meter is indicated at 30.

Figure 2:
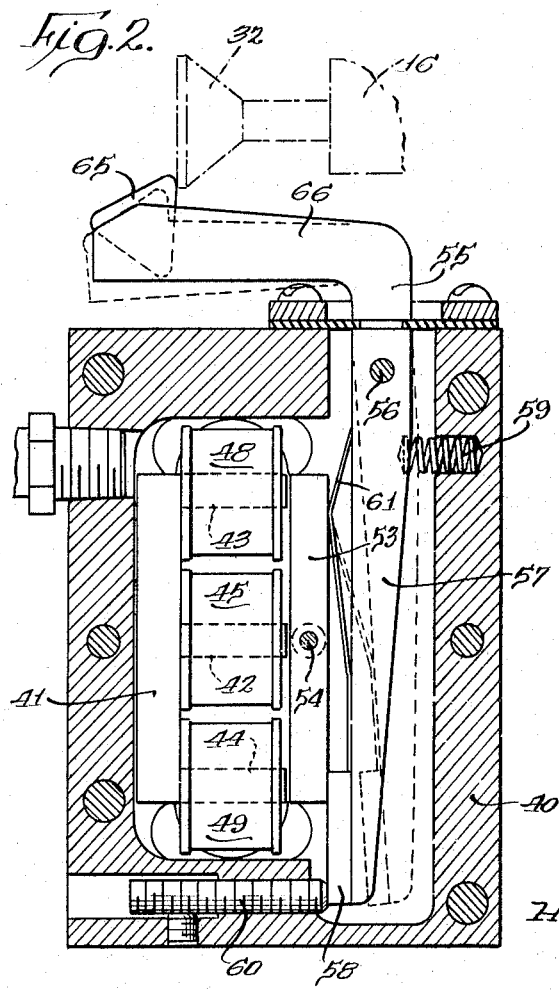
FIG. 2 is a vertical section taken generally along the line 2–2 in FIG. 1, on an enlarged scale, and with parts associated therewith shown in broken line and two different positions of the mechanism also being shown in broken line.

For the cross-slide 13, the detector 25 is mounted on the bed and is positioned for coaction with a control dog 31 carried on the cross-slide. The detector 27 for the table is carried on the cross slide and coacts with a control dog 32 on the table. The detector 29 is positioned on the table 16 and coacts with the control dog 33 mounted on the rotary table. With additional axes of movement being provided by movement of a tool on the column 11, additional detectors and indicators are provided and which would be duplicates of those shown in FIG. 1. Each of the zero position detecting and indicating mechanisms are similar and that for detecting zero position of the table 16 is shown more specifically in FIGS. 2 and 3.

Figure 3:
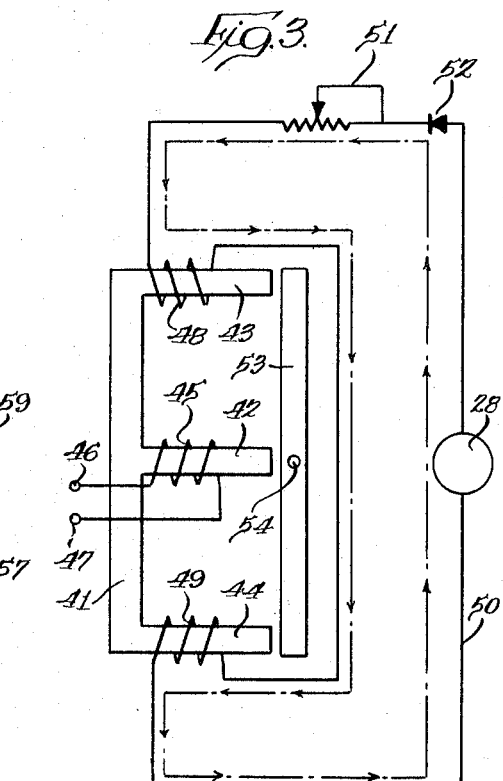
FIG. 3 is a circuit diagram of the circuit for detecting and indicating zero positioning.

The zero position detector embodies a casing 40 in which a generally E-shaped core 41 is mounted having a center arm 42 and outboard arms 43 and 44. A plurality of coils are provided, one with each of the core arms. A coil 45 is positioned about the core arm 42 and is connected to a power source at connections 46 and 47. A coil 48 is positioned about the core arm 43 and a coil 49 is positioned about the core arm 44. Referring to FIG. 3, the coils 48 and 49 are connected together in circuit in opposing relation by a line 50 with the line 50 having a calibrating resistor 51 and a diode 52 along with the indicating meter 28 which is located at the control panel, as shown in FIG. 1.

An armature 53 is mounted in the casing for pivoting about a pin 54 in line with the core center arm 42. The position of the armature is determined by an actuating lever 55, pivoted intermediate its ends at 56 to the casing. The lever has an arm 57 which is provided at an end with a wear plate 58, engageable with the armature 53. The lever 57 is urged in a clockwise direction, as viewed in FIG. 2, by a spring 59 into abutting relation with an adjustable stop screw 60. When urged to this position, contact of the wear plate 58 with the armature 53 results in the armature being spaced from the core arms 43 and 44 an equal distance to provide an equal air gap therebetween and the armature is also spaced from the center core arm 42. This position is insured by a spring 61 carried on the lever arm 57 which engages the armature 53 and causes it to accurately maintain its position in engagement with the wear plate 58 of the lever arm. With this condition existing, the air gaps between the core arms and the armature are the same, and the flux coupling from coil 45 to coils 48 and 49 is equal. The voltages induced across coils 48 and 49 are equal in amplitude and since the coils are connected 180° out of phase the sum of these two voltages appears across the meter and equals zero.

As the table 16 approaches its predetermined zero position, the control dog 32 engages a hardened surface 65 carried at an end of an arm 66 of the lever 57 and pivots the lever about the pin 56. This pivoting of the actuating lever 57 results in causing movement of the armature 53 to increase the air gap at core arm 44 and decrease the air gap at core arm 43 to increase the flux coupling to coil 48 and decrease the flux coupling to coil 49. The voltage induced in coil 48 increases and the voltage induced in coil 49 decreases. Thus, the voltages are no longer equal and a voltage appears across the coils and current flows through the circuit line 50 causing deflection in the meter 28. This meter is graduated to read current values and depending upon the setting of the calibrating resistor and the diode EI curve, a certain part of the scale on the meter will indicate that the machine tool comopnent has reached zero position. If zero position has not been reached without any contact between the control dog 32 and the detecting lever 57, a suitable control knob can be turned to cause further movement of the machine tool component or if there has been interengagement without reaching zero position, small increments of movement can be applied to the component to obtain sufficient movement for positioning of the detecting lever 57 at the proper position to give the proper reading on the meter 28.

Each of the axes of movement has a similar zero position detecting and indicating mechanism, each with its own circuit and the mechanism described herewith in connection with determining zero position of the table 16 is representative of these devices.

I claim:

1. In a numerically controlled machine tool, a pair of components with one movable relative to the other along an axis and in response to numerical control data, and a zero position detector and indicator comprising, a casing on one component, an E-shaped core positioned within said casing with three parallel and spaced apart arms defining a center arm and two outboard arms, a plurality of coils positioned one on each of said arms, a power source connected to the coil on the center arm, a separate circuit including the other two coils connected 180 degrees out of phase and a meter, an armature mounted in said casing for pivoting about an axis in line with the center arm and having a neutral position equally spaced from the outboard core arms, a lever pivoted on the casing having an external first arm carrying a sensing member with a surface normal to a load on one component, a second arm of said lever at the opposite side of the pivot engageable with the armature, and a control dog on the other component movable generally parallel with said external lever arm and into engagement with said sensing member surface from either front or rear of the sensing member for shifting the armature to vary the air gap between the outboard arms and set up unequal voltages in the coils on the outboard arms to cause current flow through the meter.

2. In a numerically controlled machine tool, a pair of components with a first of said components movable on the second component relative to an axis and in response to numerical control data, and means for determining the location of said first component at a zero position relative to said axis comprising, a casing on one of said components, a variable voltage position indicator unit in said casing including an inductive multi-arm core and an armature pivotally mounted relative to said core to adjust the distance thereof from said core arms to vary the output voltage as an indication of position, a lever pivoted on the casing having a first arm extending externally of the casing carrying a sensing member with a surface normal to a load on the first component, a second arm of the lever at the opposite side of the pivot engageable with said armature, a control dog on the other of said components movable generally parallel with the first lever arm and into engagement with said sensing member surface from either the front or rear of the sensing member whereby the position of the armature is controlled by the control dog, and the first level arm having a relatively short effective length as compared to the second lever arm whereby movement of the lever by the control dog results in amplified movement of the armature for fine control.

References Cited by the Examiner
UNITED STATES PATENTS

| | | | |
|---|---|---|---|
| 2,268,956 | 1/1942 | Mestas | 340—199 |
| 2,285,540 | 6/1942 | Stein et al. | 336—135 |
| 2,380,251 | 7/1945 | Ludbrook | 340—265 |
| 2,439,711 | 4/1948 | Bovey | 336—135 |
| 2,445,455 | 7/1948 | Rights et al. | 336—134 |
| 2,641,697 | 6/1953 | Schurr | 336—133 |
| 2,752,434 | 6/1956 | Dunlapp | 340—282 |
| 2,780,040 | 2/1957 | Goehring | 340—282 |
| 2,890,589 | 6/1959 | Duvale et al. | 318—162 |
| 2,921,298 | 1/1960 | Jackson | 336—162 |
| 2,926,345 | 2/1960 | Roeger | 340—199 |
| 2,960,688 | 11/1960 | Prochaska et al. | 340—282 |
| 3,040,221 | 6/1962 | Fitzner | 318—162 |
| 3,069,608 | 12/1962 | Forrester et al. | 318—162 |

THOMAS B. HABECKER, *Acting Primary Examiner.*

NEIL C. READ, *Examiner.*